United States Patent [19]
Schroeder et al.

[11] Patent Number: 5,304,052
[45] Date of Patent: Apr. 19, 1994

[54] SPINNING BLOCK

[75] Inventors: Heinz D. Schroeder, Frankfurt am Main; Rainer Tietze, Gross-Gerau; Guenter Koschinek, Dietzenbach, all of Fed. Rep. of Germany

[73] Assignee: Zimmer Aktiengesellschaft, Frankfurt, Fed. Rep. of Germany

[21] Appl. No.: 62,121

[22] Filed: May 14, 1993

[30] Foreign Application Priority Data

Nov. 25, 1992 [DE] Fed. Rep. of Germany ....... 4239560

[51] Int. Cl.$^5$ ............................................. B29C 47/30
[52] U.S. Cl. ............................ 425/192 S; 425/192 R; 425/198; 425/382.2; 425/464
[58] Field of Search ................. 425/72.2, 186, 192 R, 425/192 S, 131.5, 378.2, 382.2, 464, DIG. 217, 198

[56]        References Cited
U.S. PATENT DOCUMENTS

| | | | |
|---|---|---|---|
| 3,480,995 | 12/1969 | Lenk | 425/464 |
| 3,762,854 | 10/1973 | Kilsdonk | 425/382.2 |
| 4,493,628 | 1/1985 | Lenk | 425/192 S |
| 4,696,633 | 9/1987 | Lenk et al. | 425/192 S |
| 4,801,257 | 1/1989 | Lenk | 425/378.2 |

FOREIGN PATENT DOCUMENTS

| | | |
|---|---|---|
| 1660697 | 8/1967 | Fed. Rep. of Germany . |
| 2639889 | 9/1977 | Fed. Rep. of Germany ...... 425/464 |
| 3127506 | 1/1983 | Fed. Rep. of Germany ...... 425/464 |
| 3324833 | 1/1984 | Fed. Rep. of Germany ...... 425/464 |
| 1684359 | 10/1991 | U.S.S.R. ............................... 425/464 |

Primary Examiner—Khanh Nguyen
Attorney, Agent, or Firm—Allegretti & Witcoff

[57]            ABSTRACT

A spinning block for the melt spinning of polymers, consisting of a melt channel, a coupling which is attached to the spinning bar and a nozzle block casing with a filter element and a spinning nozzle plate. A connector for detachably securing said nozzle block casing to the coupling consists of at least two bolts which are positioned symmetrically and perpendicularly to the axis of spinning, which bolts engage cooperating grooves, of a particular configuration, also positioned symmetrically and concentrically to the spinning axis. The bolts can be fixed to the casing or to the coupling. The grooves are provided in the coupling or the casing to complement the location of the bolts. By rotation of the nozzle block casing with respect to the coupling around the spinning axis, the parts are locked together. Simultaneously, as the bolts slide in the grooves, the melt channel is sealed at the connecting surfaces between the coupling and the nozzle block casing, by means of bushing seals which are expanded, in a pressure-tight manner as the casing and coupling are drawn together.

8 Claims, 6 Drawing Sheets

SPINNING BLOCK

BACKGROUND OF THE INVENTION

The invention relates to a spinning block for the melt spinning of polymers, consisting of a melt channel, a coupling which is attached to the spinning bar, and a nozzle block casing containing a filter element and a spinning nozzle plate. More particularly, it relates to a detachable connecting mechanism for locking the nozzle block casing to the coupling and simultaneously sealing the melt channel at the interface between the casing and the coupling.

The assembly and the disassembly of the nozzle block should proceed as simply and as rapidly as possible, so that during regular cleaning, particularly of the spinning nozzles, the polymer waste and the down times of the apparatus are kept as low as possible. In addition, the attachment of the nozzle block, even after repeated mounting, must ensure a secure sealing of the melt channel which is subjected to high spinning melt pressures of 350 bar and more.

PRIOR ART

In order to attain rapid assembly and disassembly, German patent DE 16 60 697A, discloses a bayonet-type sealing mechanism comprising jaws and vertical and horizontal grooves. A movable piston is drawn against the ring sealing to the spinning bar and, at the same time, a sealing ring is clamped against the nozzle plate. This construction has proven disadvantageous in that, in addition to high manufacturing costs, the movable piston, under the hydraulic pressure of the melt, relieves the pressure of the lower seal against the nozzle plate, so that the nozzle tends to leakage. The principle of the movable piston is employed in accordance with U.S. Pat. No. 4,696,633 in connection with a movable membrane seal. The connection of the nozzle block is carried out by means of a multi-threaded connector whereby the threads can have recesses like a bayonet-type closure. Such types of spinning blocks are, to be sure, tight under normal operation, but tend to leak in the event of a drop in pressure. When the pressure of the melt is reapplied, the leaks continue. In addition, nozzle blocks of this type can only be disassembled under warm conditions, and are also complicated to clean. The assembly is both complicated and time consuming.

U.S. Pat. No. 3,762,854 describes, an essentially rectangular spinning head in which the spaced connecting surfaces of the upper and lower parts of the nozzle casing are sealed off with a ring-shaped band seal. The sealing effect is attained purely hydraulically through the pressure of the melt which is significantly higher than that of the atmosphere. This structure is disadvantageous in that sealing is effected only if the pressure of the melt has been fully built up. Therefore, during start-up, the melt can leak behind the seal. When the melting pressure occasionally peaks, the sealing material can even be extruded into the gap between the connecting surfaces, and thereby be destroyed.

SUMMARY OF THE INVENTION

The object of the invention is to provide a spinning block, the assembly and disassembly, cleaning and maintenance of which is possible in a simpler and faster manner than in accordance with the known state of the art; more particularly, to provide a detachable connection which makes it possible to carry out these operations even under cold conditions and using less highly-trained personnel. In addition, the spinning block, both during normal operation, including the start up, as well as during operational disturbances, should be absolutely tight against the pressure of the melt, and should be manufactured as economically as possible.

The construction of the connecting mechanism between the nozzle block casing and the coupling, which in turn is attached to the spinning bar, is the key to accomplishing the objectives of the invention. This connecting mechanism consists of at least two and, preferably, from 2 to 4 bolts or pins which are positioned symmetrically and perpendicularly to the axis of spinning, which bolts engage, in the manner of a bayonet-type closure, with the same number of complementary grooves positioned concentrically and symmetrically to the axis of spinning. The particular curve-shaped configuration of the grooves in accordance with the invention is essential. The bolts may be fixed to the nozzle block casing or to the coupling. The cooperating grooves may be provided in the coupling or the casing to complement the location of the bolts. The groove is akin to a cam and the bolt to a cam follower.

As used herein, the "spinning axis" is an imaginary central line extending through the spinning head, parallel to the discharge of the filaments which are spun off from the spinning nozzle plate which is round to slightly oval in shape.

The closure bolts can be solidly countersunk into either the coupling or into the nozzle block casing, as indicated. For a higher bearing strength, the bolts can be flattened in the area which engages with the grooves. Particularly in the case of smaller spinning heads, the bolts preferably are countersunk into the coupling. The upper end of the nozzle block casing which mates with the lower end of the coupling terminates in an annular collar. The complementary grooves are cut into the internal side of the collar or, for the purpose of simpler manufacture, may be cut completely through the wall of the collar. An inlet aperture is provided in the top of the collar which connects to the groove in the collar wall. The groove continues, relative to an imaginary horizontal plane perpendicular to the spinning axis, and located at the level of said inlet aperture, concentrically about said axis, first descending at an angle relative to said plane of from 70° to 90°, then ascending at an angle of from 10° to 20° inclined toward said plane, followed by descending by an angle of from 10° to 20° away from said plane and, finally, ascending at an angle of from 0° to 20° toward said plane. These angles preferably correspond—in uniform sequence—to 75°, 15°, 15°, and 0° or 15°. By rotating the nozzle block around the spinning axis approximately 20° to 40°, depending upon the size of the block, the nozzle block casing, in a simple manner, may be solidly locked or unlocked with the coupling. The assembly or disassembly is possible, both under cold conditions and warm conditions.

The sealing off of the melt channel at the connecting interfaces within the nozzle block is carried out by means of bushing-type seals which expand radially within the channel upon application of axial force. Through the specific configuration of the grooves in accordance with the invention, the bolts, through cam action, draw the mating parts together and apply that force. In one form of the invention, the nozzle block casing, and if present, a pressure ring positioned therein, are drawn to the coupling, and the bushing seal which is disposed between shoulders within the melt channel, is spread outwardly against slightly tapering accommodation borings. This manner of sealing offers high security sealing, both during normal operation, including starting-up, and also during operational pressure variations, particularly, drops in pressure. The bushing seals can be manufactured in any size, and their handling is extremely simple.

When, instead of a sieve netting, a sand filter is used as the filter element in the nozzle block casing, a pressure ring, within the casing is pressed against the sand filter by means of a threaded ring screwed into the nozzle block casing. The sand filter can be enclosed by a bushing or ring against which the pressure ring bears. A second bushing seal is disposed at the lower interface of the pressure ring and the nozzle block casing, via the sand bushing, which seal is expanded to provide an axial force when the threaded ring is screwed into the nozzle block casing. The sand bushing is preferably conically enlarged towards the bottom. The sand bushing, or ring, surrounding the sand filter prevents the polymer melt from coming in contact with the casing. Hence, the cleaning of the nozzle block casing is eliminated to the greatest extent. In addition, the assembly of the sand filter is facilitated.

As mentioned above, the bolts can be solidly countersunk into the wall of the nozzle block casing, and the complementary grooves can be positioned within the coupling. The bolt-on-casing construction is recommended if, instead of a rigid coupling, a spring biased coupling system is used. This construction consists of a central post solidly anchored in a spinning bar and a concentric coupling ring which is supported in a resilient manner on the post. The grooves are cut in the external side of the coupling ring. The bolts project from the inner wall of a collar on the casing surrounding the coupling ring.

The bolt-on-casing construction is also recommended for larger spinning blocks. In this case, for ease of assembly, especially in view of the weight of the nozzle block, it is not the casing which is lengthened by a collar, but the coupling fixed to the spinning bar which extends downwardly, collar-like around the nozzle casing.

The grooves which are positioned in the coupling have the same curve-shaped configuration as the grooves which are positioned in the nozzle block, but are inverted. The grooves proceed through a series of segments from the inlet aperture up to the end position, the segments being inclined at the angles stated above, but first ascending, then descending, followed by ascending and then, finally, again descending. The locking of the nozzle block casing to the coupling is accomplished, as previously described, by rotation of the casing.

As is described above, the sealing off of the melt channel against the abutting surfaces within the nozzle block is effected, in this closure arrangement, by means of one or two bushing seals, each of which are radially expanded in a pressure-tight manner as the spinning block is assembled.

THE DRAWINGS

The invention will now be illustrated in greater detail by means of the accompanying drawings in which.

DETAILED DESCRIPTION

Figure 1:
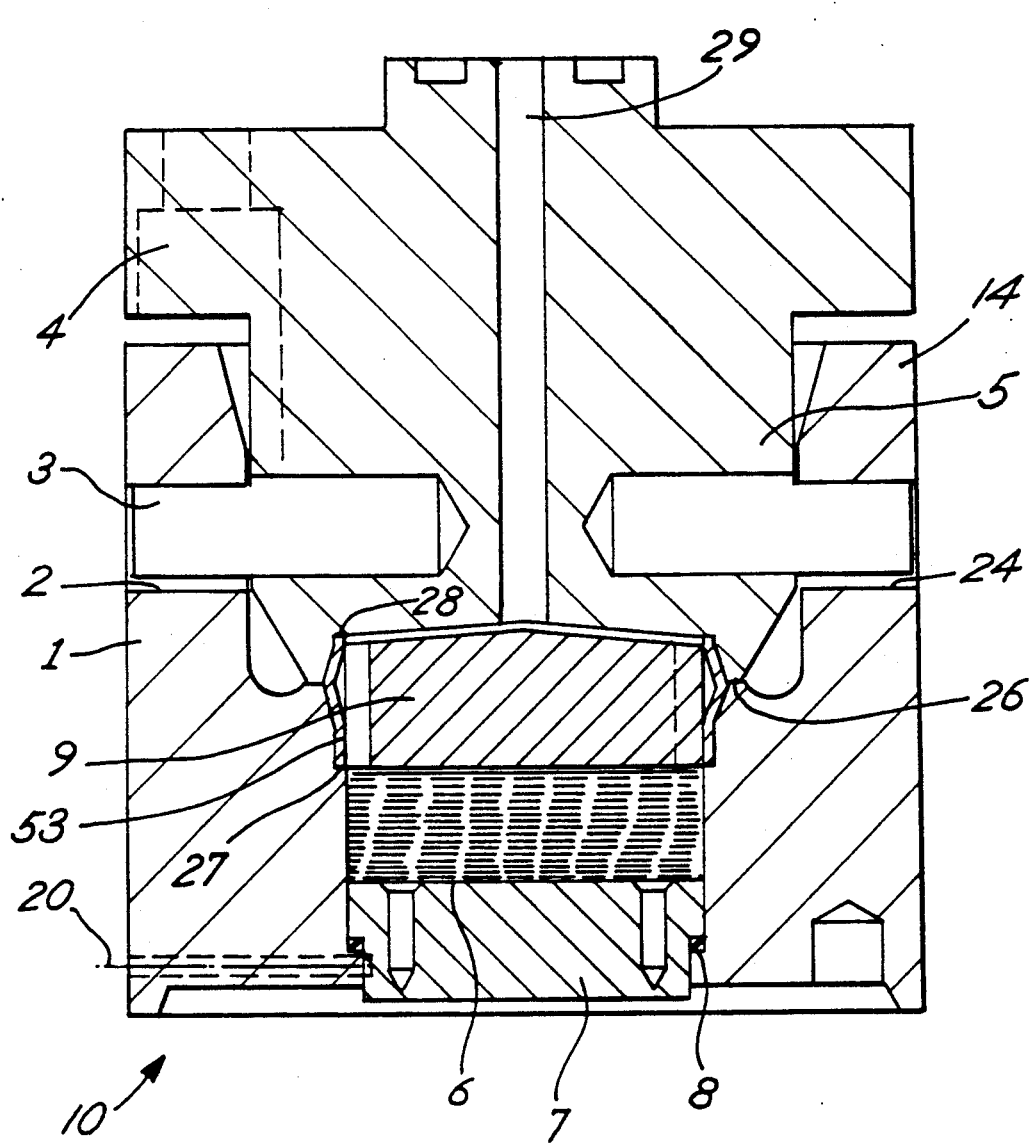
FIG. 1 is a longitudinal sectional view through a spinning head having a filter package of a sieve netting, and a coupling which carries the bolts which slide in complementary grooves in the head casing.

FIG. 1 depicts a spinning head, indicated generally at 10, which is equipped with a filter package of sieve netting, without sand filter, in the assembled condition, ready for operation. This spinning head is constructed in a simple manner: the nozzle block casing 1 carries the conventional nozzle plate 7 and, above this, a loose filter package 6. The nozzle plate 7, as is conventional, is secured against twisting by means of the adjusting rod 20 within the casing 1, and is sealed off in the downward direction by means of the gasket seal 8. Above the filter package 6, there is positioned a displacement plate 9, by means of which the filter 6 is prevented from slipping during the assembly of the spinning head. During operation, the plate improves the flow of the melt. A central melt channel 29 extends through said coupling 4 and into said casing 1 to supply polymer melt to the nozzle plate 7.

The nozzle block casing 1 has an axial collar 14. Grooves 2 are cut in the inner face of the collar, which grooves have the configuration shown in FIGS. 7 or 8 as described below. A cylindrical coupling 4 is solidly screwed to a spinning bar (not shown) and has a projection 5 of smaller diameter than the coupling base. Bolts 3 are countersunk into the wall of coupling projection 5, one bolt for each of the complementary grooves 2 in the casing collar 14. The sealing of the connecting surface of the nozzle block casing 1 to the coupling 4 is carried out, in accordance with the invention, by means of a bushing seal 53 which surrounds the displacement plate 9, and has a diameter equal to, or slightly greater than, the external diameter of the filter 6. When expanded, the seal 53 covers the interface 26 between the end of coupling projection 5 and the mating surface of casing 1. During the locking of the bolt/groove closure, the nozzle block casing 1 is fitted over projection 5 with the bolts 3 in their complementary grooves. By action of the bolts sliding in the grooves, as the casing is rotated, the nozzle block casing 1 is drawn vertically upwardly against the coupling 4. By that means, an axially force deforms the first cylindrical bushing seal 53 which is compressed between shoulders 27 in the casing and 28 in the coupling.

Figure 2:
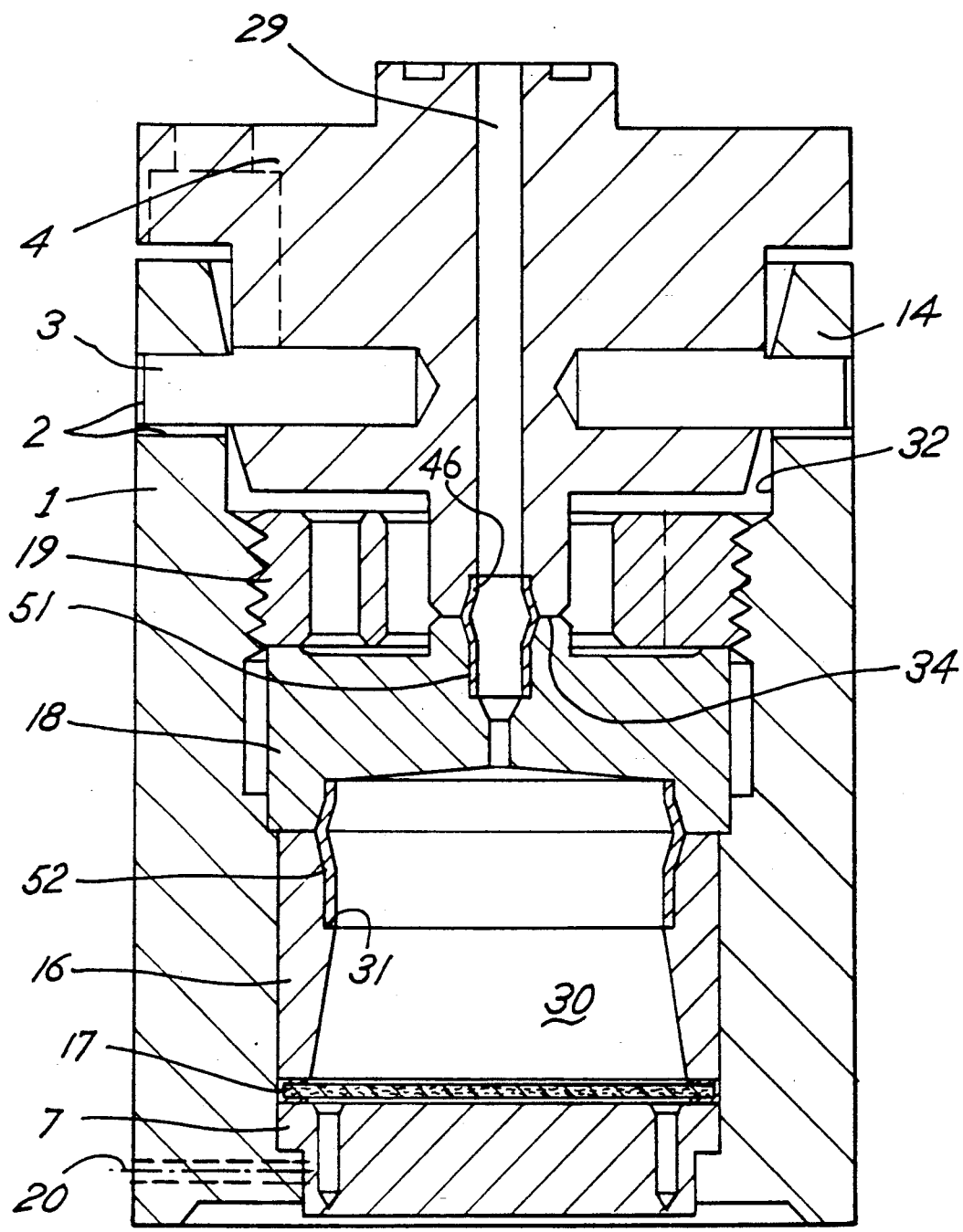
FIG. 2 is a view similar to FIG. 1 in which the spinning head has a sand filter and sand jacket.

FIG. 2 likewise depicts a spinning head in the assembled condition, ready for operation. The nozzle block casing 1, by means of the slot-like grooves 2, coupled to the bolts 3, is held against the coupling 4, which in turn—in a manner not depicted here—is attached to a spinning bar by means of screws. The nozzle block consists, in the known manner, of parts installed in the casing 1 (from bottom to top): the nozzle plate 7, which is secured against twisting within the casing 1 by means of an adjusting rod 20; above that, a self-sealing filter 17 of the conventional type. On top of that, there is positioned a sand jacket 16 containing the sand filter 30. Sand jacket 16 has a shoulder 31 which supports the bushing seal 52. A pressure ring 18 is pressed downwardly by means of a threaded ring 19 screwed into the mouth 32 of the collar 14, which keeps the large bushing seal 52 deformed in a sealing-capable manner and the sand jacket 16 fixed within the casing 1. Ring 18 also holds the small bushing seal 51 in expanded position in order to seal the interface 34 between the coupling 4 and the pressure ring 18. Both of the bushing seals 51 and 52 are shaped, by means of small axial forces of the supporting elements into the sealing-capable condition: the small bushing seal 51, through the coupling of the nozzle block casing to the coupling 4 by sliding the bolts in their grooves, and the large bushing seal 52, prior to said coupling, through the tightening of the threaded ring 19 in the casing 1.

Figure 3:
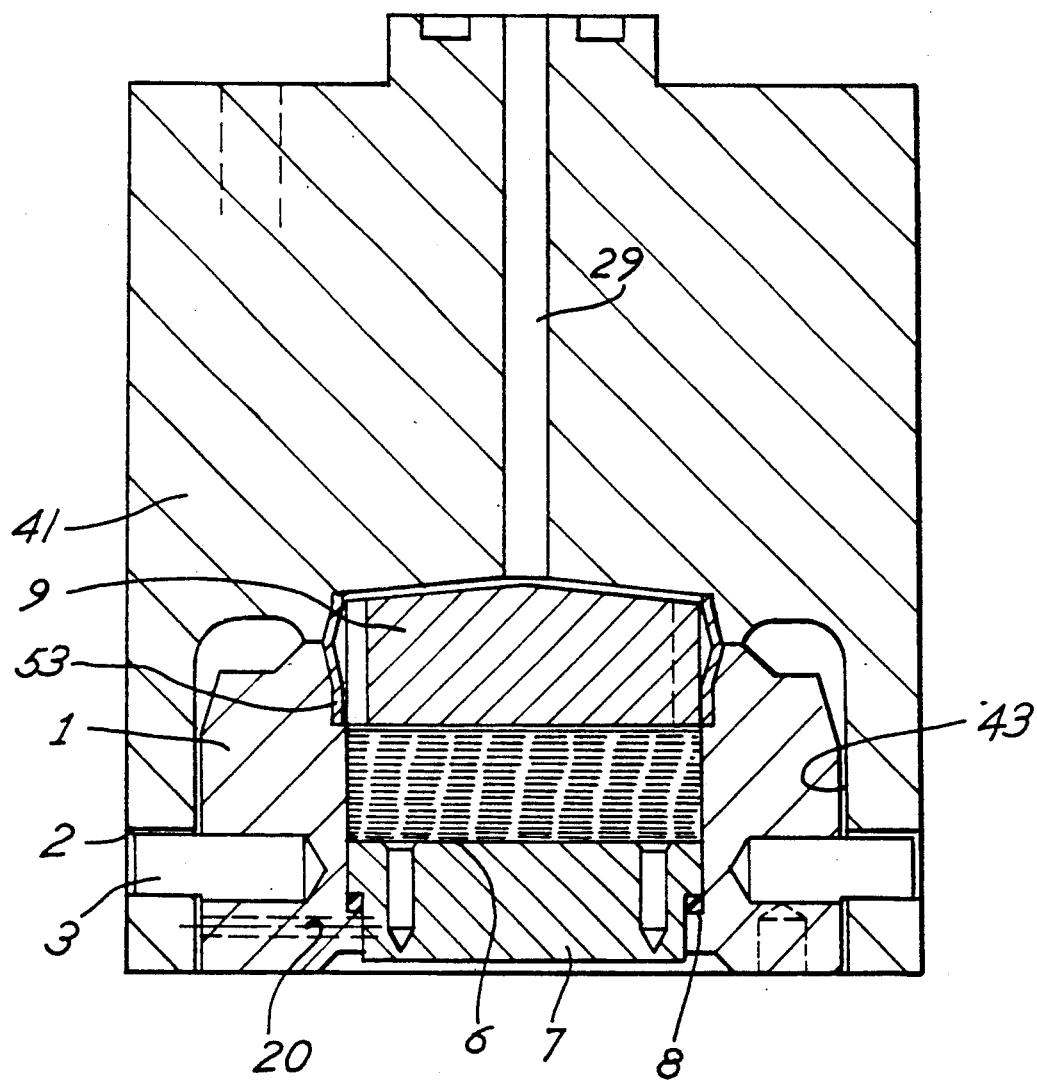
FIG. 3 is a longitudinal sectional view through a spinning head having a filter package of sieve netting in which the closure bolts are countersunk into the nozzle block casing and the complementary grooves are cut in the coupling.
Figure 9:
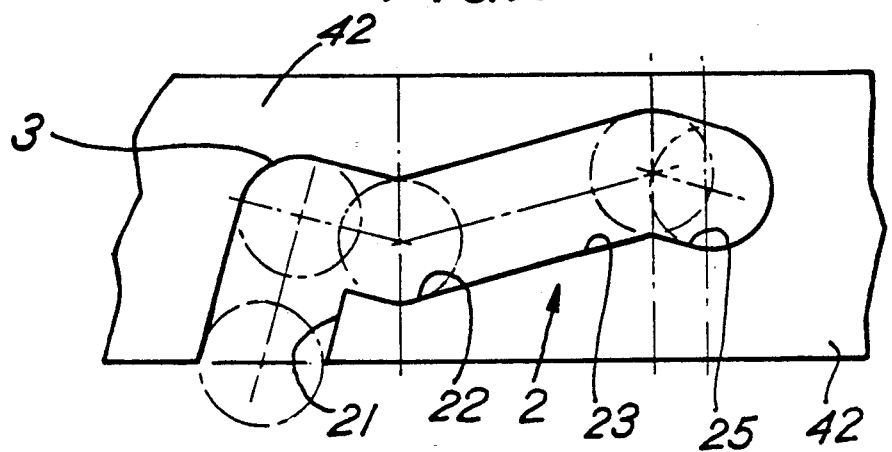
FIGS. 9 and 10 are sectional views showing the orientation of the grooves in the coupling of FIGS. 4 and 3, respectively.

FIG. 3 depicts a spinning head constructed in a similarly simple manner as that of FIG. 1, but using a closure arrangement which is preferred for large spinning heads. Whereas, in the spinning head of FIG. 1, the nozzle block casing 1 largely surrounds the coupling 4, the nozzle block casing 1, in this case, is inserted into the coupling 41. The bolts 3 are solidly countersunk in the lower part of the nozzle block casing 1. The complementary grooves 2 in the coupling 41—which is extended, in the manner of a collar 43, in a downward direction—are constructed as slots, as best shown in FIG. 9. Otherwise, the locking of the closure, and the expansion of the bushing sealing 53 which is dependent on the rotation of the mating parts, are precisely as described with respect to FIG. 1.

Figure 4:
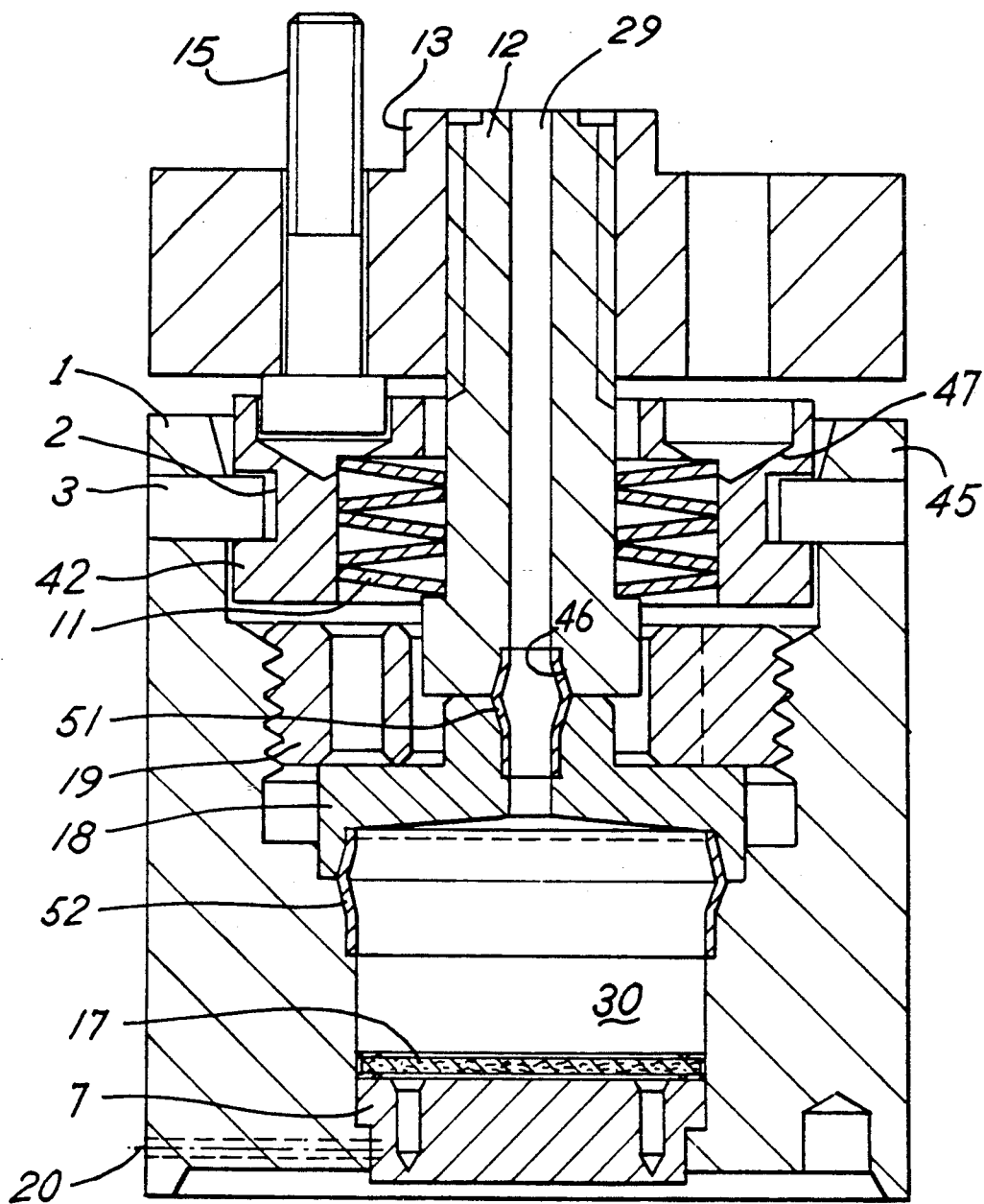
FIG. 4 is a longitudinal sectional view of a modified construction in which the spinning head has a sand filter and the nozzle block casing carries the closure bolts and the complementary grooves are cut into the wall of a spring biased coupling ring.

Another construction of the spinning head in accordance with the invention is depicted in FIG. 4. The grooves 2 are positioned in the outer surface of coupling ring 42 and the bolts 3 are fixed in the collar 45 of the casing 1. The coupling system is spring mounted. The entire coupling system consists of the following individual parts: the springs 11 support the coupling ring 42 on the peg or post 12, which is screwed into the flange 13 or other stationary support. This flange 13 is attached, by means of the screws 15, to the spinning bar, not shown. The heads of the screws 15, fit into depressions 47 in the top of coupling ring 42 to secure the coupling ring against twisting during assembly of the mating parts. The docking connection of the nozzle block casing is carried out, in this case, precisely as in the examples already described, although the groove 2 has a so-called "locking engagement end position" indicated at 25 in FIG. 8. This is necessary because the resiliency permits a rebound of the coupling ring 42. In this construction, the bushing seal 51 may be replaced by means of a cap-type seal or another known seal. The remaining structure of the spinning block corresponds to that of FIG. 2, except that the sand filter has no sand jacket corresponding to element 16.

Figure 5:
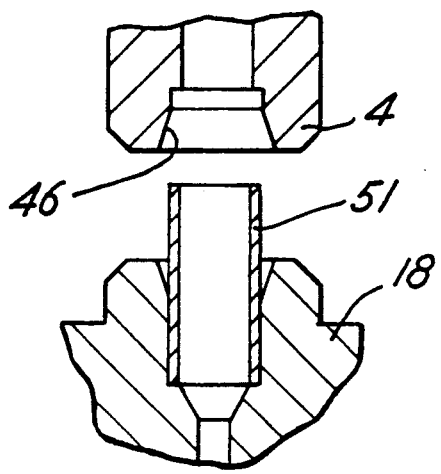
FIGS. 5 and 6 are sectional views through the melt channel and bushing seal of FIG. 2, before and after assembly, respectively.
Figure 6:
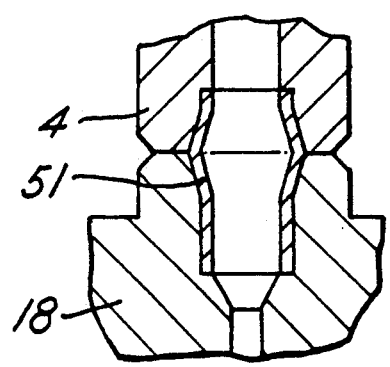

The expansion of the bushing seal 51 during assembly of the mating parts is depicted in FIGS. 5 and 6. In FIG. 5, the bushing seal 51 is inserted in the pressure ring 18 prior to expansion. An accommodation boring 46 is provided in the coupling 4 or post 12. The accommodation borings 46 have a slight taper of approximately 8° to 12° to the vertical. The bushing seal is approximately 5 to 10% longer than the corresponding accommodation borings. As shown in FIG. 6, bushing seal 51 expands through the docking of the pressure ring 18 with the coupling 4 or the post 12 (FIGS. 2, 4, respectively), into its sealing-capable condition, and fills out the accommodation borings. The cylindrical part of the accommodation boring extends into the pressure ring 18 to accommodate the lower end of bushing 51. This serves, on the one hand, for the secure mounting of the bushing seal and, on the other hand, to ensure that when the mating parts are uncoupled, the deformed seal is disassembled at the same time.

Figure 7:
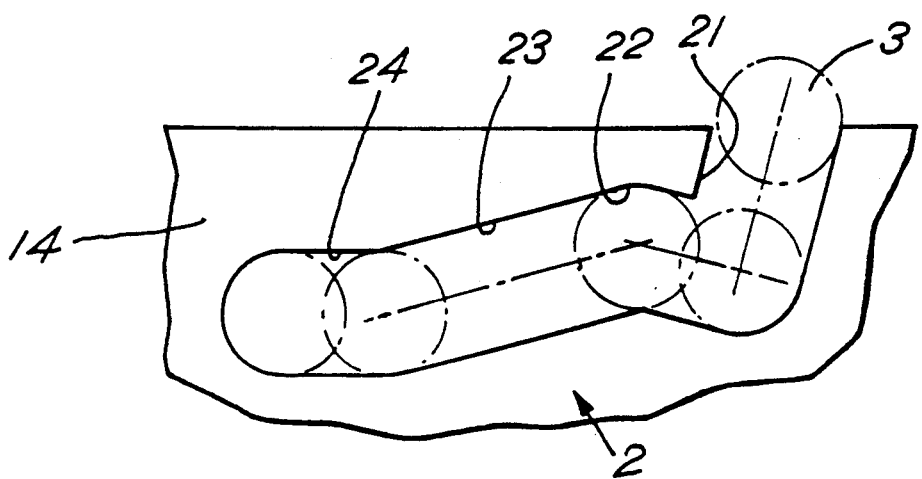
FIGS. 7 and 8 are sectional views showing the orientation of the grooves in the nozzle block casing of FIGS. 1 and 2.
Figure 10:
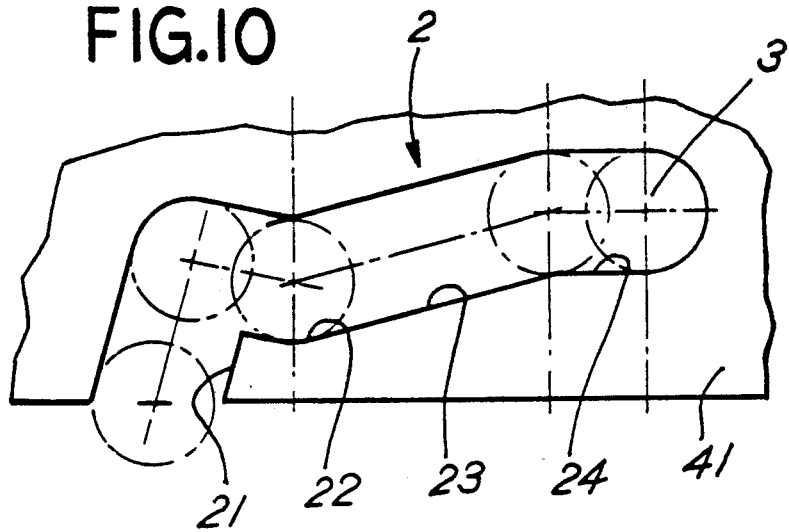

FIG. 7 and FIG. 10 show bolts 3 in their various positions as they travel through the cam-like segments of the grooves 2 during assembly of the mating parts. After traveling a vertical or obliquely-vertical distance, which through the inlet aperture (first segment) 21, the bolts enter the second or securing segment 22 of the configuration followed by the third segment 23. After passing the third segment 23 for tension increase, the bushing seal 51 is deformed. Finally, the movement ends in the straight end or the holding position fourth segment 24. As can be seen from the drawings, the grooves consist of 4 segments inclined at different angles with respect to a horizontal plane perpendicular to the axis of said melt channel 29: segment one 70°-20°; segment two 10°-20°; segment three 10°-20°; and segment four 0° (horizontal). The configuration depicted in FIG. 7, with the inlet aperture open at the top, is the type of closure depicted in FIGS. 1 and 2. Bolts 3 are countersunk solidly into the coupling 4. The configuration of FIG. 10, with the inlet aperture open at the bottom, is suited for spinning heads of the type shown in FIG. 3 with the bolts 3 solidly countersunk into the nozzle block casing 1.

Figure 8:
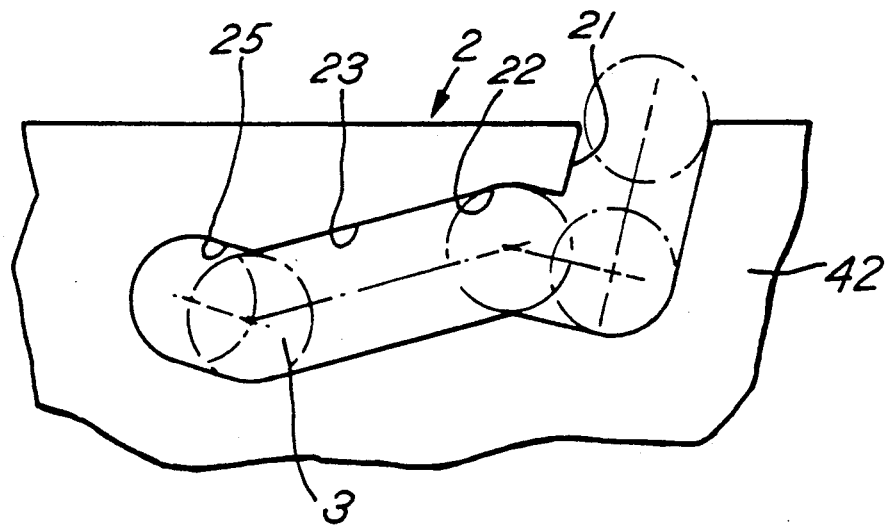

FIG. 8 and FIG. 9 both depict another variant of the configuration of the groove 2. Differing from the configuration described above, the end position segment is constructed here as a locking emgagement end position 25 inclined clearly with respect to said horizontal plane. This construction is generally applicable but is particularly designed for use with spring-mounted couplings 42 (FIG. 4). Since the spring mounting permits a slight rebound, the bolt can be engaged in the inclined end position. The bolts do not need to be flattened in the engaging area, as advisable for higher bearing strength in the structures without springs. The construction with the inlet aperture open at the top (FIG. 8) is used in spinning heads where the bolts 3 are solidly countersunk into the coupling 4, as shown in FIGS. 1 and 2; also with the inlet aperture opening downwardly with the bolts 3 countersunk into the nozzle block casing 1, as shown in FIG. 4.

We claim:

1. A spinning block for melt spinning polymers comprising two main parts, one of these parts surrounding the other collar-like, and consisting of a nozzle block casing including a filter element and a spinning nozzle plate, and of a coupling connected to said nozzle block casing, further including a central melt channel extending through said coupling and into said casing to supply polymer to said spinning nozzle plate, an expandable bushing disposed in said melt channel at an interface between said casing and said coupling and locking means for detachably securing said casing to said coupling, said locking means comprising at least two bolts secured to one of said two main parts, said bolts being disposed radially with respect to the axis of said melt channel, at least two grooves within the second of said two main parts for receiving and guiding each of said bolts each said groove being positioned concentrically with respect to said axis and having a curved configuration extending from an inlet aperture to a groove end, said configuration comprising four segments disposed at different angles inclined with respect to a plane perpendicular to said axis and parallel to said interface at the level of said inlet aperture, said angles being defined as follows:

a first segment, adjacent said inlet aperture disposed at an angle of between 70° and 90°, a second segment disposed at an angle between 10° and 20° inclined toward said plane, a third segment disposed at an angle between 10° and 20° inclined away from said plane, a fourth segment disposed at an angle of 0° to 20° inclined toward said plane whereby as said casing and said coupling are rotated with respect to each other, said bolts slide within said grooves to draw said casing and coupling together, to expand said bushing to seal the melt channel at said interface and to lock said coupling and said casing together.

2. The spinning block of claim 1 in which said bolts are fixed within said casing and said grooves are disposed within said coupling.

3. The spinning block of claim 1 in which said bolts are fixed within said coupling and said grooves are disposed within said casing.

4. The spinning block of claim 1 in which said filter element includes a filter package behind said nozzle plate and a displacement plate in contact with said filter package to prevent slippage of said filter package when said coupling and said casing are not locked together.

5. The spinning block of claim 4 in which said displacement plate is disposed at the level of said interface, and said bushing surrounds said displacement plate, and has a diameter at least as large as the external diameter of said filter package.

6. The spinning block of claim 3 in which said filter element includes a self-sealing filter behind said nozzle plate, a sand filter behind said self-sealing filter, a pressure ring in contact with said sand filter for fixing said sand filter within said casing, a second expandable bushing surrounding said sand filter at the interface of said sand filter and said pressure ring, and a threaded ring bearing against said pressure ring, whereby rotating said threaded ring urges said pressure ring against said sand filter and simultaneously expands said second bushing.

7. The spinning block of claim 2 in which said coupling includes a ring axially moveable on a central post through which said melt channel extends, and said nozzle block casing includes a sand filter behind said nozzle plate, a pressure ring in contact with said sand filter, a second expandable bushing surrounding said sand filter at the interface of said sand filter and said pressure ring, a threaded ring bearing against said pressure ring to urge the pressure ring against said sand filter said pressure ring having a central opening which joins said melt channel at the bottom of said post, said first expandable bushing surrounding the interface between said post bottom and said pressure ring, spring means surrounding said post, biasing said coupling ring away from said casing, whereby said bolts on said casing are locked within said fourth segment of said grooves within said coupling ring.

8. The spinning block of claim 6 in which said sand filter is surrounded by a sand jacket bearing at its lower end against said self-sealing filter and a circumferential inner shoulder which supports said second bushing, the inner diameter of said sand jacket increasing outwardly from said shoulder to said self-sealing filter.

* * * * *